US011483045B2

(12) United States Patent
Song et al.

(10) Patent No.: US 11,483,045 B2
(45) Date of Patent: Oct. 25, 2022

(54) METHOD AND DEVICE OF TRANSMITTING AND RECEIVING REFERENCE SIGNAL

(71) Applicant: VIVO MOBILE COMMUNICATION CO., LTD., Guangdong (CN)

(72) Inventors: Yang Song, Chang'an Dongguan (CN); Peng Sun, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 152 days.

(21) Appl. No.: 16/969,928

(22) PCT Filed: Jan. 28, 2019

(86) PCT No.: PCT/CN2019/073399
§ 371 (c)(1),
(2) Date: Aug. 13, 2020

(87) PCT Pub. No.: WO2019/157939
PCT Pub. Date: Aug. 22, 2019

(65) Prior Publication Data
US 2021/0013942 A1    Jan. 14, 2021

(30) Foreign Application Priority Data

Feb. 14, 2018  (CN) .......................... 201810152167.8

(51) Int. Cl.
*H04B 7/06* (2006.01)
*H04L 5/00* (2006.01)
*H04W 72/04* (2009.01)

(52) U.S. Cl.
CPC ......... *H04B 7/0626* (2013.01); *H04L 5/0051* (2013.01); *H04L 5/0094* (2013.01); *H04W 72/042* (2013.01); *H04W 72/0453* (2013.01)

(58) Field of Classification Search
CPC ... H04B 7/0626; H04L 5/0051; H04L 5/0094; H04L 5/001; H04L 5/0098; H04L 5/005;
(Continued)

(56) References Cited

U.S. PATENT DOCUMENTS

2014/0241319 A1  8/2014 Lee et al.
2016/0270107 A1  9/2016 Dinan
(Continued)

FOREIGN PATENT DOCUMENTS

CN  103858467 A  6/2014
CN  103875201 A  6/2014
(Continued)

OTHER PUBLICATIONS

CN Office Action in Application No. 201810152167.8.
(Continued)

*Primary Examiner* — Kiet Tang
(74) *Attorney, Agent, or Firm* — Maschoff Brennan (57) ABSTRACT

A method of transmitting a reference signal is provided. The method is applied to a network device and includes: transmitting a first indication on a second downlink frequency domain transmission resource, wherein the first indication is used to activate a first downlink frequency domain transmission resource; transmitting a CSI-RS on the first downlink frequency domain transmission resource according to a first CSI resource configuration corresponding to the first downlink frequency domain transmission resource when it is determined that there is the first CSI resource configuration, wherein the first CSI resource configuration includes a periodicity characteristic of the CSI-RS.

20 Claims, 4 Drawing Sheets

(58) Field of Classification Search
CPC .............. H04L 5/0053; H04W 72/042; H04W 72/0453
See application file for complete search history.

(56) References Cited

U.S. PATENT DOCUMENTS

| | | |
|---|---|---|
| 2017/0005764 A1 | 1/2017 | Park et al. |
| 2017/0201306 A1 | 7/2017 | Shimezawa et al. |
| 2018/0007731 A1 | 1/2018 | Park et al. |
| 2018/0098361 A1* | 4/2018 | Ji .......................... H04L 45/00 |
| 2019/0132862 A1* | 5/2019 | Jeon ..................... H04L 5/0064 |
| 2019/0149213 A1* | 5/2019 | Zhou .................... H04L 5/0057 |
| | | 370/329 |
| 2020/0177336 A1 | 6/2020 | Li |

FOREIGN PATENT DOCUMENTS

| | | |
|---|---|---|
| CN | 106105303 A | 11/2016 |
| CN | 107211296 A | 9/2017 |
| CN | 109391986 A | 2/2019 |

OTHER PUBLICATIONS

Written Opinion and International Search Report in Application No. PCT/CN2019/073399 dated Aug. 27, 2020.
"Remaining Issues on other aspect of carrier aggregation" 3GPP TSG RAN WG1 Meeting 91, Nov. 27, 2017.
"Details of BWP switching operation" 3GPP TSG RAN WG1 Meeting AH1801, Jan. 22, 2018.
"RLM/RRM measurements after BWP switching" Jan. 22, 2018.

* cited by examiner

METHOD AND DEVICE OF TRANSMITTING AND RECEIVING REFERENCE SIGNAL

CROSS-REFERENCE TO RELATED APPLICATION

The present application is the U.S. national phase of PCT Application No. PCT/CN2019/073399 filed on Jan. 28, 2019, which claims a priority to the Chinese patent application No. 201810152167.8 filed in China on Feb. 14, 2018, a disclosure of which is incorporated herein by reference in its entirety.

TECHNICAL FIELD

The present disclosure relates to the field of communication technology, in particular to a method of transmitting and receiving a reference signal and a device of transmitting and receiving a reference signal.

BACKGROUND

With the development of mobile communication technologies, $5^{th}$ generation (5G) mobile communication systems are on the horizon. To support greater system throughput and user equipment (UE) throughput, 5G systems support frequency domain division, so that UE may transmit and receive signals on different frequency domain transmission resources.

For example, 5G systems support a maximum system bandwidth of 400 MHz, which is far greater than the maximum system bandwidth of 20 MHz in LTE, thereby supporting greater system throughput and UE throughput. Meanwhile, 5G systems also support flexible dynamic bandwidth allocation, wherein system bandwidth may be divided into multiple bandwidth parts (Band Width Part, BWPs), to support narrow-band UE or UE in a power saving mode to operate only on a portion of the system bandwidth.

For another example, 5G systems may employ carrier aggregation (Carrier Aggregation, CA), wherein two or more component carriers (Component Carrier, CCs) may be aggregated together to support greater transmission bandwidth. Each CC corresponds to an independent cell. A cell operating on primary band is called primary cell (PCell), while a cell operating on the secondary band is called secondary cell (SCell). During wireless communication process, various SCells may be activated (or enabled) as needed, to provide additional radio resources to meet communication requirements.

In a communication system provided with a plurality of frequency domain transmission resources, wireless communication may be performed by activating different frequency domain transmission resources based on requirements. Therefore, a method of transmitting and receiving a reference signal is needed, so that transmission and reception of periodic/semi-persistent channel state information reference signals (CSI-RSs) may be kept uninterrupted when the frequency domain transmission resource changes.

SUMMARY

An objective of the embodiments of the present disclosure is to provide a method and a device for transmitting and receiving a reference signal, so that reception and transmission of CSI-RSs may be kept uninterrupted when a variation in frequency domain transmission resource occurs.

In a first aspect, the present disclosure provides a method for transmitting a reference signal. The method is applied to a network device and includes: transmitting a first indication on a second downlink (DL) frequency domain transmission resource, wherein the first indication is used to activate a first DL frequency domain transmission resource; transmitting a channel state information reference signal (CSI-RS) on the first DL frequency domain transmission resource according to a first CSI resource configuration corresponding to the first DL frequency domain transmission resource when it is determined that there is the first CSI resource configuration, wherein the first CSI resource configuration includes a periodicity characteristic of the CSI-RS.

In a second aspect, the present disclosure provides a method for receiving a reference signal. The method is applied to UE and includes: receiving a first indication on a second downlink (DL) frequency domain transmission resource, wherein the first indication is used to activate a first DL frequency domain transmission resource; receiving a channel state information reference signal (CSI-RS) on the first DL frequency domain transmission resource according to a first CSI resource configuration corresponding to the first DL frequency domain transmission resource when it is determined that there is the first CSI resource configuration, wherein the first CSI resource configuration includes a periodicity characteristic of the CSI-RS.

In a third aspect, the present disclosure provides a network device, including: an operation indication transmission module, configured to transmit a first indication on a second downlink (DL) frequency domain transmission resource, wherein the first indication is used to activate a first DL frequency domain transmission resource; a reference signal (RS) transmission module, configured to transmit a channel state information reference signal (CSI-RS) on the first DL frequency domain transmission resource according to a first CSI resource configuration corresponding to the first DL frequency domain transmission resource when it is determined that there is the first CSI resource configuration, wherein the first CSI resource configuration includes a periodicity characteristic of the CSI-RS.

In a fourth aspect, the present disclosure provides UE, including: an operation indication reception module, configured to receive a first indication on a second downlink (DL) frequency domain transmission resource, wherein the first indication is used to activate a first DL frequency domain transmission resource; a reference signal (RS) reception module, configured to receive a channel state information reference signal (CSI-RS) on the first DL frequency domain transmission resource according to a first CSI resource configuration corresponding to the first DL frequency domain transmission resource when it is determined that there is the first CSI resource configuration, wherein the first CSI resource configuration includes a periodicity characteristic of the CSI-RS.

In a fifth aspect, the present disclosure provides a network device, including: a storage, a processor and a computer program stored in the storage and configured to be executed by the processor, wherein the processor is configured to execute the computer program, to implement steps of the method described in the first aspect.

In a sixth aspect, the present disclosure provides a computer readable storage medium storing therein a computer program, wherein the computer program is configured to be executed by a processor, to implement steps of the method described in the first aspect.

In a seventh aspect, the present disclosure provides UE, including: a storage, a processor and a computer program stored in the storage and configured to be executed by the processor, wherein the processor is configured to execute the computer program, to implement steps of the method described in the second aspect.

In an eighth aspect, the present disclosure provides a computer readable storage medium storing therein a computer program, wherein the computer program is configured to be executed by a processor, to implement steps of the method described in the second aspect.

In embodiments of the present disclosure, when a new frequency domain transmission resource is activated, the signal transmission and reception may be performed according to configuration information corresponding to the new frequency domain transmission resource, thereby enabling uninterrupted wireless communication. For example, when a network device is transmitting a CSI-RS, if a new DL frequency domain transmission resource is activated, such as the BWP is switched to a new BWP or a new secondary cell is enabled, the transmission and reception of CSI-RS may be performed in an uninterrupted manner by using the method for transmitting and receiving a reference signal according to some embodiments of the present disclosure, thereby meeting communication requirements of the wireless communication system.

BRIEF DESCRIPTION OF THE DRAWINGS

The drawings described here serve to facilitate the understanding of the present disclosure, and constitute a part of the present disclosure. The exemplary embodiments and descriptions thereof in the present disclosure are used to explain the present disclosure, and place, by no means, an undue limitation on the present disclosure. In the drawing.

DETAILED DESCRIPTION

The technical solutions in the embodiments of the present disclosure are clearly and thoroughly described below with reference to the accompanying drawings of the embodiments of the present disclosure. Apparently, the described embodiments are some embodiments of the present disclosure, but are not all the embodiments. Based on the embodiments of the present disclosure, all other embodiments derived by a person of ordinary skill in the art without any creative efforts shall fall within the scope of the present disclosure.

The technical solutions of the present disclosure may be applied to various communication systems similarly provided with multiple frequency domain transmission resources or space domain positions, such as a $5^{th}$ generation (5G) New Radio (NR) mobile communication system, LTE connected to 5G core network (5GC), eLTE (evolved universal terrestrial radio access (E-UTRA) connected to 5GC).

UE, also called mobile terminal (MT), mobile user equipment, etc., may communicate with one or more core networks via a radio access network (RAN). The UE may be a mobile terminal, e.g., a mobile phone (or cellular phone) or a computer provided with a mobile terminal, such as a portable, pocket-sized, handheld, computer built-in or in-vehicle mobile apparatus, which exchanges voice and/or data with the RAN.

The base station may be a base transceiver station (BTS) in global system for mobile communications (GSM) or code division multiple access (CDMA), or may be a Node B in wideband code division multiple access (WCDMA), or may be an evolved Node B (eNB or eNodeB) in LTE or a 5G gNodeB (gNB), which is not limited in the present disclosure. However, for ease of description, a gNB is used as an example in description of following embodiments.

To achieve more flexible signal reception and transmission, frequency domain may be divided in 5G systems. For example, the system bandwidth may be divided into multiple portions to form multiple bandwidth parts (BWPs); optionally, frequency bands, carriers or component carriers of a system may be divided to form multiple frequency domain transmission resources or to form multiple secondary cells (SCell).

In a communication system, the network device may configure frequency domain transmission resources of serving cell for UE. For example, at least one downlink (DL) BWP for DL reception can be configured for UE through higher layer signaling, namely, radio resource control (RRC) message. If multiple DL BWPs are configured, a DL BWP set may be formed. It may be stipulated that the network device may configure at most four DL BWPs for UE. For another example, at least one uplink (UL) BWP for UL transmission can be configured for UE through higher layer signaling, namely, RRC message. If multiple UL BWPs are configured, an UL BWP set may be formed. It may be stipulated that the network device may configure at most four UL BWPs for UE.

For a communication system provided with multiple frequency domain transmission resources as a result of division (taking the frequency domain transmission resource being BWP for example), the network device may indicate, as needed, an activated DL BWP by transmitting downlink control information (DCI) over a physical downlink control channel (PDCCH). For example, the network device may activate a DL BWP by using a BWP indicator field in the DCI. Accordingly, the UE receives information over the PDCCH and a physical downlink shared channel (PDSCH) according to the subcarrier spacing and the length of cyclic prefix (CP) in the numerology corresponding to the DL BWP indicated by the DCI.

Additionally, the network device may indicate, as needed, an activated UL BWP by using the BWP indicator field in the DCI. Accordingly, the UE transmits information over a physical uplink control channel (PUCCH) and a physical uplink shared channel (PUSCH) according to the subcarrier spacing and the length of cyclic prefix (CP) configured for the UL BWP.

Hereinafter, the technical solutions provided by various embodiments of the present disclosure are described in detail with reference to the accompanying drawings.

Embodiment 1

Figure 1:
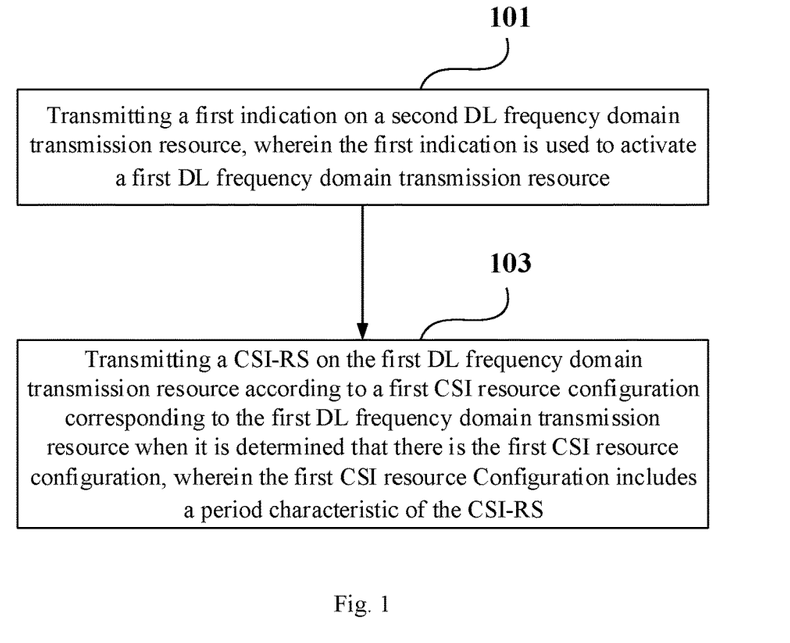
FIG. 1 is a schematic flow diagram of a method of transmitting a reference signal implemented by a network device according to some embodiments of the present disclosure.

Referring to FIG. 1, an embodiment of the present disclosure provides a method for transmitting a reference signal, which is applied to a network device. The method is used to transmit a CSI-RS and may specifically include following steps.

Step 101: transmitting a first indication on a second DL frequency domain transmission resource, wherein the first indication is used to activate a first DL frequency domain transmission resource.

It is noted, the first indication transmitted by the network device through performing the Step 101 may activate a first DL frequency domain transmission resource. For example, when the frequency domain transmission resource is a DL BWP, the network device may switch the DL BWP from a second DL BWP (which may be denoted as DL BWPi) to a first DL BWP (which may be denoted as DL BWPj) by transmitting the first indication. It is understood, after the DL BWP is switched to the first DL BWP, the network device stops transmitting information to UE in the second DL BWP.

For another example, when the frequency domain transmission resource is a DL SCell, the network device may activate a first DL SCell (which may be denoted as DL SCellj) by transmitting the first indication. It is understood, after the first DL SCellj is activated (or enabled), the network device may transmit information to UE in the first DL SCellj; meanwhile, the network device may continue transmitting information to UE in a second DL SCell (which may be denoted as DL SCelli) where the first indication is transmitted or a DL PCell.

Optionally, when the DL frequency domain transmission resource is a DL BWP, the network device may transmit DCI including the first indication, to activate the first DL frequency domain transmission resource (specifically, the first DL BWP).

Optionally, when the DL frequency domain transmission resource is a DL SCell, the network device may transmit a medium access control-control element (MAC CE) including the first indication, to activate the first DL frequency domain transmission resource (specifically, the first DL SCell).

Step 103: transmitting a CSI-RS on the first DL frequency domain transmission resource according to a first CSI resource configuration corresponding to the first DL frequency domain transmission resource when it is determined that there is the first CSI resource configuration, wherein the first CSI resource configuration includes a periodicity characteristic of the CSI-RS.

It is noted, the CSI resource configuration corresponding to the DL frequency domain transmission resource may be configured by the network device through transmitting configuration information carrying the CSI resource configuration. The configuration information may be transmitted by means of an RRC message. In a specific implementation, the configuration information may include a CSI resource configuration corresponding to at least one DL frequency domain transmission resource. Optionally, the configuration information may further include a CSI resource configuration corresponding to all DL frequency domain transmission resources. The network device may set a CSI resource configuration independently for each DL frequency domain transmission resource (that is, each CSI resource configuration corresponds only to one DL frequency domain transmission resource), or the network device may configure one CSI resource configuration for multiple corresponding DL frequency domain transmission resources, e.g., all DL frequency domain transmission resources.

Optionally, the configuration information of the CSI resource configuration may include a periodicity characteristic of CSI-RS, which specifically includes periodic (P), semi-persistent (SP) and aperiodic (AP). For a periodic CSI-RS (which may be denoted as P-CSI-RS) or a semi-persistent CS-RS (which may be denoted as SP-CSI-RS), the configuration information of the CSI resource configuration may include period configuration parameter of CSI-RS (which may be denoted as CSI-RS-timeConfig parameter), which is used to configure period parameter of the CSI-RS and may specifically include transmission periodicity, slot offset and the like. The configuration information of the CSI resource configuration may further include information on a CSI reference signal (which may be denoted as CSI-RS) resource, such as quantity of ports and pattern. Optionally, the P-CSI-RS and/or SP-CSI-RS may include one or more of non-zero power CSI-RS (which may be denoted as NZP CSI-RS), zero power CSI-RS (which may be denoted as ZP CSI-RS) used for rate matching, CSI interference measurement (which may be denoted as CSI-IM) or the like.

Optionally, the DL BWP corresponding to a CSI resource configuration may act as a time reference for the transmission periodicity (in units of slot) and the slot offset (in units of slot) of the P-CSI-RS or SP-CSI-RS associated with the CSI resource configuration. If a DL BWP switch occurs and the numerology changes, even if the periodicity value and slot offset value in units of slot of CSI-RS remain unchanged, the periodicity and the slot offset in units of second of P-CSI-RS or SP-CSI-RS transmitted in the newly activated DL BWP would change in connection with the change of DL BWP numerology.

Figure 2:
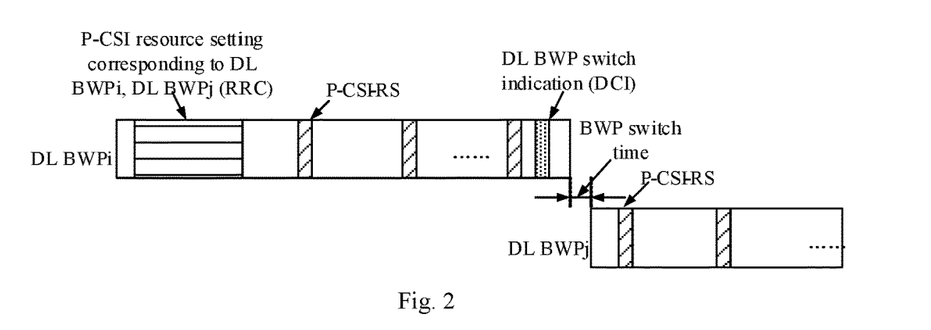
FIG. 2 is a schematic timing diagram of information transmission by a network device according to a method provided in some embodiments of the present disclosure.

For a periodic CSI-RS (which may be denoted as P-CSI-RS), as long as the network device determines that the first CSI resource corresponding to the first DL frequency domain transmission resource has been configured, in another word, as long as the network device determines that there is a first CSI resource configuration corresponding to the first DL frequency domain transmission resource, the transmission of the CSI-RS may be activated. Therefore, the network device can directly transmit the CSI-RS on the first DL frequency domain transmission resource according to the first CSI resource configuration, referring to the timing diagram of FIG. 2. Correspondingly, UE may receive the CSI-RS on the first DL frequency domain transmission resource according to the first CSI resource configuration.

For a semi-persistent CSI-RS (which may be denoted as SP-CSI-RS), when the network device determines that the first CSI resource corresponding to the first DL frequency domain transmission resource has been configured, in another word, when the network device determines that there is a first CSI resource configuration corresponding to the first DL frequency domain transmission resource, there may be multiple manners of activating the SP-CSI-RS transmission. Moreover, the time when the first DL frequency domain transmission resource (e.g., the DL BWPj) is activated may be prior to or subsequent to the time when the SP-CSI-RS transmission is activated.

Figure 3:
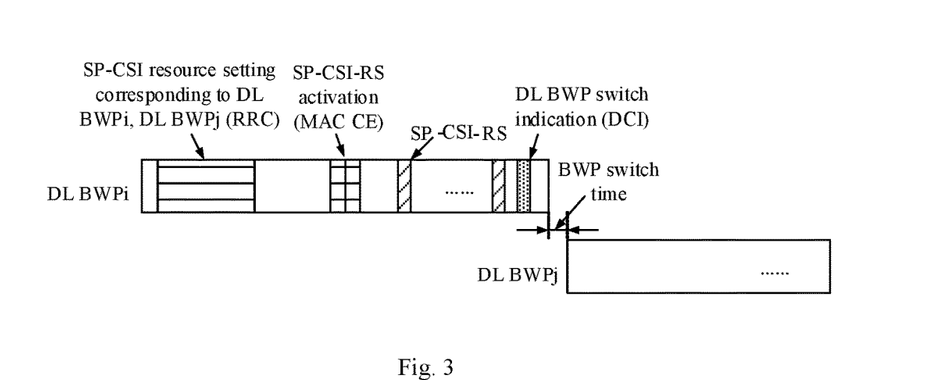
FIG. 3 is a second schematic timing diagram of information transmission by a network device according to a method provided in some embodiments of the present disclosure.

Optionally, after transmitting the first indication to activate the first DL frequency domain transmission resource, the network device may transmit a first activation indication on the first DL frequency domain transmission resource. Referring to the timing diagram of FIG. 3, assuming that the DL frequency domain transmission resource is DL BWP, and the SP-CSI-RS transmission in the DL BWPi has been activated (possibly by means of an MAC CE) and is underway according a configured transmission periodicity, when a first indication of a switch from the DL BWPi to DL BWPj has been transmitted by the network device, and the DL BWP is switched to DL BWPj after a switch time (at this time, the DL BWPj is in an active state), the network device stops transmitting SP-CSI-RS in the DL BWPj, correspondingly, the UE stops receiving the SP-CSI-RS in the DL BWPj. The network device won't transmit the SP-CSI-RS according to the CSI resource configuration corresponding to the DL BWPj, until the network device transmits to UE a first activation indication in the DL BWPj to reactivate (also possibly by means of an MAC CE) the SP-CSI-RS corresponding to the DL BWPj. Correspondingly, the UE won't receive the SP-CSI-RS according to the CSI resource configuration corresponding to the DL BWPj until then.

Optionally, the network device may also transmit a first activation indication on the second DL frequency domain transmission resource before transmitting the first indication to activate the first DL frequency domain transmission resource. After the DL frequency domain transmission resource is switched to the first DL frequency domain transmission resource (e.g., DL BWPj), the SP-CSI-RS may be transmitted directly according to the CSI resource configuration corresponding to the first DL frequency domain transmission resource. Correspondingly, the UE receives the SP-CSI-RS according to the CSI resource configuration corresponding to the first DL frequency domain transmission resource.

It is understood, the first activation indication may serve to activate the SP-CSI-RS transmission on the first DL frequency domain transmission resource (e.g., DL BWPj), or serve to activate the SP-CSI-RS transmission on at least one DL frequency domain transmission resource (it is understood, the at least one DL frequency domain transmission resource includes the first DL frequency domain transmission resource). Specifically, when the CSI configuration information includes a CSI resource configuration corresponding to at least one DL frequency domain transmission resource, the first activation indication may be used to activate the SP-CSI-RS configured by a CSI resource configuration included in the CSI configuration information that corresponds to any DL frequency domain transmission resource.

It is noted, transmission of the first activation indication may include: transmitting an MAC CE, which includes the first activation indication.

Optionally, the network device may transmit the first activation indication by carrying the first activation indication in the first indication. For example, in the case that the frequency domain transmission resource is BWP, the first indication is DCI. In this case, a field may be added in the DCI to indicate which SP-CSI-RS configured by a CSI resource configuration should be transmitted on a certain DL frequency domain transmission resource; or an existing field in the DCI may be repurposed to indicate which SP-CSI-RS configured by a CSI resource configuration should be transmitted on a certain DL frequency domain transmission resource.

Figure 4:
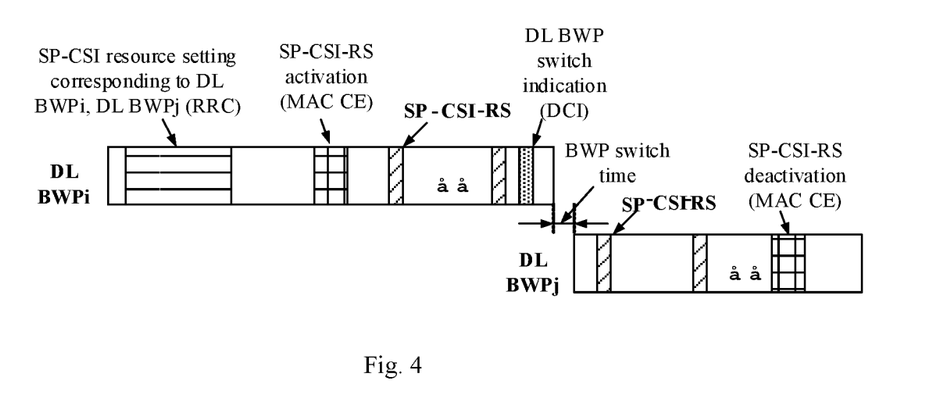
FIG. 4 is a third schematic timing diagram of information transmission by a network device according to a method provided in some embodiments of the present disclosure.

Optionally, referring to the timing diagram of FIG. 4, before transmitting a deactivation indication, the network device may transmit SP-CSI-RS according to the first CSI resource configuration corresponding to the first DL frequency domain transmission resource without reactivation (the SP-CSI-RS has been activated on the second DL frequency domain transmission resource). The network device stops transmitting the CSI-RS on the first DL frequency domain transmission resource when a deactivation indication is transmitted by the network device, wherein the deactivation indication is used to inform the UE that the network device will stop the CSI-RS transmission on at least one DL frequency domain transmission resource, and/or instruct the UE to stop receiving the CSI-RS on at least one DL frequency domain transmission resource. It is understood, the at least one DL frequency domain transmission resource includes the first DL frequency domain transmission resource. Correspondingly, having received the deactivation indication, the UE stops receiving the CSI-RS on the first DL frequency domain transmission resource.

The above description illustrates, by way of example, how to transmit CSI-RS with a periodicity characteristic of periodic or semi-persistent when it is determined that a first CSI resource configuration corresponding to the first DL frequency domain transmission resource is available.

Optionally, regardless of whether the CSI-RS has a periodicity characteristic of periodic or semi-persistent, when it is determined that there is no first CSI resource configuration corresponding to the first DL frequency domain transmission resource, the network device does not transmit CSI-RS corresponding to the first DL frequency domain transmission resource after the first DL frequency domain transmission resource is in an active state. Correspondingly, UE does not receive CSI-RS corresponding to the first DL frequency domain transmission resource.

Optionally, when it is determined that multiple CSI resource configurations corresponding to the first DL frequency domain transmission resource are available, the latest CSI resource configuration may be determined as the first CSI resource configuration; further, the network device transmits CSI-RS corresponding to the first DL frequency domain transmission resource on the first DL frequency domain transmission resource based on the first CSI resource configuration. Correspondingly, UE receives the CSI-RS corresponding to the first DL frequency domain transmission resource on the first DL frequency domain transmission resource based on the latest CSI resource configuration (the first CSI resource configuration). It is understood, "the latest configuration" refers to a first CSI resource configuration whose configuration time is closest to the time when the first DL frequency domain transmission resource is activated.

In the embodiment of the present disclosure, when a new frequency domain transmission resource is activated, the signal transmission and reception may be performed according to configuration information corresponding to the new frequency domain transmission resource, thereby enabling uninterrupted wireless communication. When a network device is transmitting a CSI-RS, if a new UL and/or DL frequency domain transmission resource is activated, such as the BWP is switched to a new BWP or a new secondary cell is enabled, the transmission of CSI-RS may be performed in an uninterrupted manner by using the method of transmitting a reference signal according to some embodiments of the present disclosure, thereby meeting communication requirements of the wireless communication system.

Embodiment 2

Figure 5:
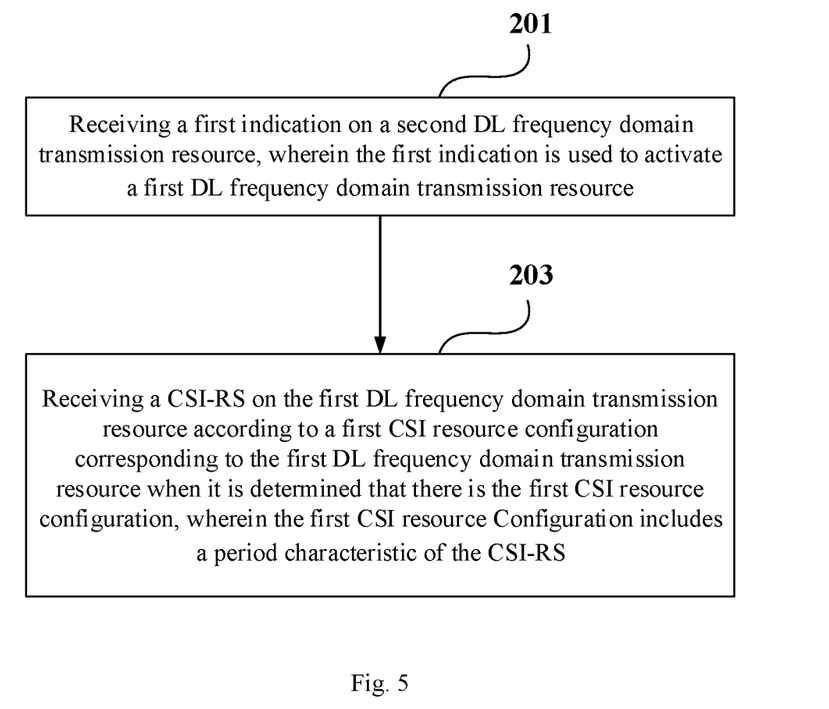
FIG. 5 is a schematic flow diagram of a method of transmitting a reference signal implemented by UE according to some embodiments of the present disclosure.

Referring to FIG. 5, an embodiment of the present disclosure provides a method of receiving a reference signal. The method is applied to UE and includes the following steps.

Step 201: receiving a first indication on a second DL frequency domain transmission resource, wherein the first indication is used to activate a first DL frequency domain transmission resource.

Step 203: receiving a CSI-RS on the first DL frequency domain transmission resource according to a first CSI resource configuration corresponding to the first DL frequency domain transmission resource when it is determined that there is the first CSI resource configuration, wherein the first CSI resource configuration includes a periodicity characteristic of the CSI-RS.

Optionally, the method further includes: receiving first configuration information including a CSI resource configuration corresponding to at least one DL frequency domain transmission resource, wherein the at least one DL frequency domain transmission resource includes the first DL frequency domain transmission resource; or receiving second configuration information including a CSI resource configuration corresponding to all DL frequency domain transmission resources, wherein the all DL frequency domain transmission resources include the first DL frequency domain transmission resource.

Optionally, the method may further include: determining a latest CSI resource configuration as the first CSI resource configuration when it is determined that there are a plurality of CSI resource configurations corresponding to the first DL frequency domain transmission resource.

Optionally, the periodicity characteristic of the CSI-RS is periodic.

Optionally, the periodicity characteristic of the CSI-RS is semi-persistent, the receiving the CSI-RS on the first DL frequency domain transmission resource according to the first CSI resource configuration includes: receiving the CSI-RS on the first DL frequency domain transmission resource according to the first CSI resource configuration when it is determined that the first DL frequency domain transmission resource is in an active state and a first activation indication is received from a network device, wherein the first activation indication is used to activate reception of the CSI-RS on the first DL frequency domain transmission resource, or is used to activate reception of the CSI-RS on at least one DL frequency domain transmission resource.

Optionally, the method may further include any one of: receiving the first activation indication on the second DL frequency domain transmission resource before reception of the first indication; receiving the first activation indication on the first DL frequency domain transmission resource after reception of the first indication.

Optionally, the first indication carries the first activation indication.

Optionally, the periodicity characteristic of the CSI-RS is semi-persistent, and the method further includes: stopping receiving the CSI-RS on the at least one DL frequency domain transmission resource when receiving a deactivation indication, wherein the at least one DL frequency domain transmission resource includes the first DL frequency domain transmission resource.

Optionally, the DL frequency domain transmission resources include at least one of DL BWP and DL secondary cell.

It is understood, the interaction between the network device and the UE described from the perspective of the UE side is the same as those described from the network device side in Embodiment 1, thus a detailed description thereof is omitted herein to avoid redundancy.

In the embodiment of the present disclosure, when a new frequency domain transmission resource is activated, the signal transmission and reception may be performed according to configuration information corresponding to the new frequency domain transmission resource, thereby enabling uninterrupted wireless communication. When a network device is transmitting a CSI-RS, if a new UL and/or DL frequency domain transmission resource is activated, such as the BWP is switched to a new BWP or a new secondary cell is enabled, the transmission of CSI-RS may be performed in an uninterrupted manner by using the method for transmitting a reference signal according to some embodiments of the present disclosure, thereby meeting communication requirements of the wireless communication system.

Embodiment 3

Figure 6:
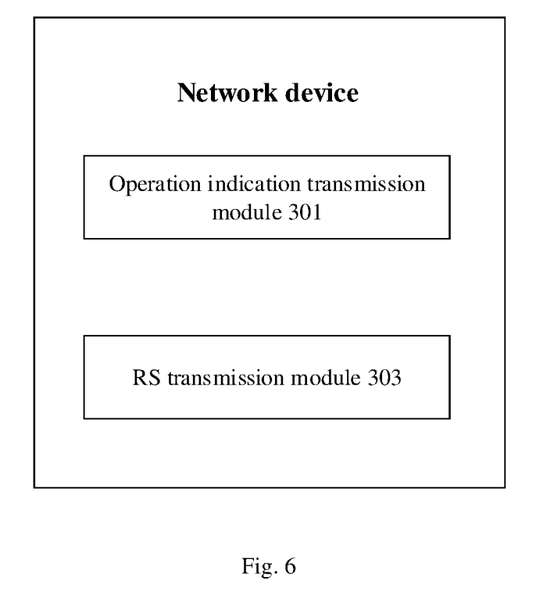
FIG. 6 is a schematic structural diagram of a network device according to some embodiments of the present disclosure.

An embodiment of the present disclosure further provides a network device. Referring to FIG. 6, the network device includes: an operation indication transmission module 301, configured to transmit a first indication on a second DL frequency domain transmission resource, wherein the first indication is used to activate a first DL frequency domain transmission resource; a reference signal (RS) transmission module 303, configured to transmit a CSI-RS on the first DL frequency domain transmission resource according to a first CSI resource configuration corresponding to the first DL frequency domain transmission resource when it is determined that there is the first CSI resource configuration, wherein the first CSI resource configuration includes a periodicity characteristic of the CSI-RS.

Optionally, the network device further includes: a first configuration information transmission module, configured to transmit first configuration information including a CSI resource configuration corresponding to at least one DL frequency domain transmission resource, wherein the at least one DL frequency domain transmission resource includes the first DL frequency domain transmission resource; or a second configuration information transmission module, configured to transmit second configuration information including a CSI resource configuration corresponding to all DL frequency domain transmission resources, wherein the all DL frequency domain transmission resources include the first DL frequency domain transmission resource.

Optionally, the network device further includes: a first CSI resource configuration determination module, configured to determine a latest CSI resource configuration as the first CSI resource configuration when it is determined that there are a plurality of CSI resource configurations corresponding to the first DL frequency domain transmission resource.

Optionally, the periodicity characteristic of the CSI-RS is semi-persistent, the RS transmission module includes: a first RS transmission unit, configured to transmit the CSI-RS on the first DL frequency domain transmission resource according to the first CSI resource configuration when it is determined that the first DL frequency domain transmission resource is in an active state and a first activation indication is transmitted to UE, wherein the first activation indication is used to activate transmission of the CSI-RS on the first DL frequency domain transmission resource, or is used to activate transmission of the CSI-RS on at least one DL frequency domain transmission resource.

Optionally, the network device further includes any one of: a first activation indication transmission module, configured to transmit the first activation indication on the second DL frequency domain transmission resource before transmission of the first indication; a second activation indication transmission module, configured to transmit the first activation indication on the first DL frequency domain transmission resource after transmission of the first indication.

Optionally, the periodicity characteristic of the CSI-RS is semi-persistent, the network device further includes: a deactivation indication transmission module, configured to stop transmitting the CSI-RS on the at least one DL frequency domain transmission resource when transmitting a deactivation indication, wherein the at least one DL frequency domain transmission resource includes the first DL frequency domain transmission resource.

It is understood, the network device provided in the embodiment of the present disclosure may implement the method performed by a network device in Embodiment 1, and the related description in Embodiment 1 is applicable to this embodiment, thus a detailed description thereof is omitted herein.

In the embodiment of the present disclosure, when a new frequency domain transmission resource is activated, the signal transmission and reception may be performed according to configuration information corresponding to the new frequency domain transmission resource, thereby enabling uninterrupted wireless communication. When a network device is transmitting a CSI-RS, if a new UL and/or DL frequency domain transmission resource is activated, such as the BWP is switched to a new BWP or a new secondary cell is enabled, the transmission of CSI-RS may be performed in an uninterrupted manner by using the method for transmitting a reference signal according to some embodiments of the present disclosure, thereby meeting communication requirements of the wireless communication system.

Embodiment 4

Figure 7:
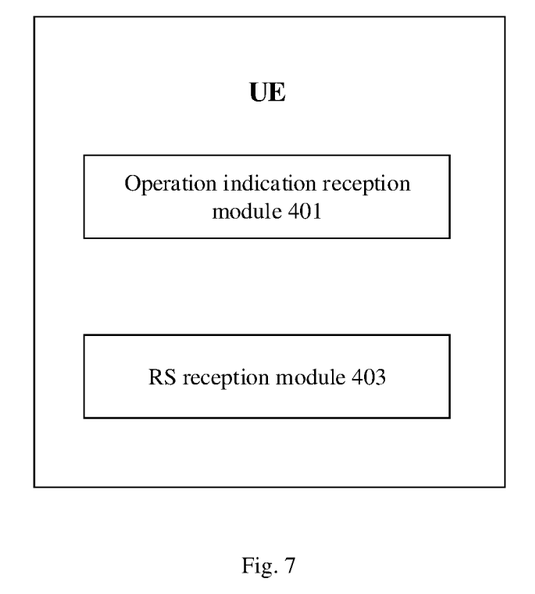
FIG. 7 is a schematic structural diagram of UE according to some embodiments of the present disclosure.

Referring to FIG. 7, an embodiment of the present disclosure provides UE. The UE includes: an operation indication reception module 401, configured to receive a first indication on a second DL frequency domain transmission resource, wherein the first indication is used to activate a first DL frequency domain transmission resource; a reference signal (RS) reception module 403, configured to receive a CSI-RS on the first DL frequency domain transmission resource according to a first CSI resource configuration corresponding to the first DL frequency domain transmission resource when it is determined that there is the first CSI resource configuration, wherein the first CSI resource configuration includes a periodicity characteristic of the CSI-RS.

Optionally, the UE further includes: a first configuration information reception module, configured to receive first configuration information including a CSI resource configuration corresponding to at least one DL frequency domain transmission resource, wherein the at least one DL frequency domain transmission resource includes the first DL frequency domain transmission resource; or a second configuration information reception module, configured to receive second configuration information including a CSI resource configuration corresponding to all DL frequency domain transmission resources, wherein the all DL frequency domain transmission resources include the first DL frequency domain transmission resource.

Optionally, the UE further includes: a first CSI resource configuration determination module, configured to determine a latest CSI resource configuration as the first CSI resource configuration when it is determined that there are a plurality of CSI resource configurations corresponding to the first DL frequency domain transmission resource.

Optionally, the periodicity characteristic of the CSI-RS is semi-persistent, the RS reception module includes: a first RS reception unit, configured to receive the CSI-RS on the first DL frequency domain transmission resource according to the first CSI resource configuration when it is determined that the first DL frequency domain transmission resource is in an active state and a first activation indication is received from a network device, wherein the first activation indication is used to activate reception of the CSI-RS on the first DL frequency domain transmission resource, or is used to activate reception of the CSI-RS on at least one DL frequency domain transmission resource.

Optionally, the UE further includes any one of: a first activation indication reception module, configured to receive the first activation indication on the second DL frequency domain transmission resource before reception of the first indication; a second activation indication reception module, configured to receive the first activation indication on the first DL frequency domain transmission resource after reception of the first indication.

Optionally, the periodicity characteristic of the CSI-RS is semi-persistent, the UE further includes: a deactivation indication reception module, configured to stop receiving the CSI-RS on the at least one DL frequency domain transmission resource when receiving a deactivation indication, wherein the at least one DL frequency domain transmission resource includes the first DL frequency domain transmission resource.

It is understood, the UE provided in the embodiment of the present disclosure may implement the method performed by UE in Embodiment 2, and the related description in Embodiment 1 and Embodiment 2 is applicable to this embodiment, thus a detailed description thereof is omitted herein.

In the embodiment of the present disclosure, when a new frequency domain transmission resource is activated, the signal transmission and reception may be performed according to configuration information corresponding to the new frequency domain transmission resource, thereby enabling uninterrupted wireless communication. When a network device is transmitting a CSI-RS, if a new UL and/or DL frequency domain transmission resource is activated, such as the BWP is switched to a new BWP or a new secondary cell is enabled, the transmission of CSI-RS may be performed in an uninterrupted manner by using the method for transmitting a reference signal according to some embodiments of the present disclosure, thereby meeting communication requirements of the wireless communication system.

Embodiment 5

Figure 8:
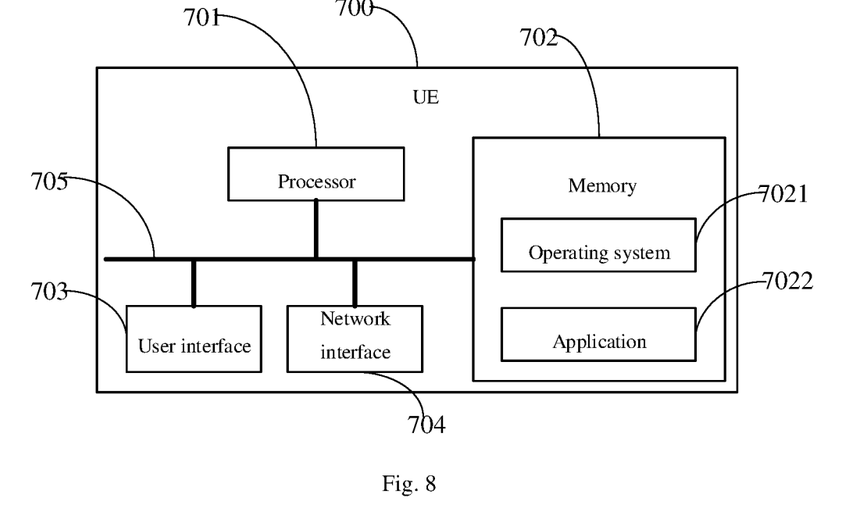
FIG. 8 is another schematic structural diagram of UE according to some embodiments of the present disclosure.

FIG. 8 is a block diagram of UE according to another embodiment of the present disclosure. The UE 700 as shown in FIG. 8 includes: at least one processor 701, a memory 702, at least one network interface 704, and a user interface 703. The various components in the UE 700 are coupled together by a bus system 705. It may be understood that the bus system 705 is configured to implement connection and communication among these components. The bus system 705 further includes a power bus, a control bus, and a status signal bus in addition to a data bus. However, for clarity of description, various buses in FIG. 8 are all labeled as the bus system 705.

The user interface 703 may include a display, a keyboard or a point-and-click device (for example, a mouse), a trackball, a touch pad, a touch screen, or the like.

It may be understood that the memory 702 in some embodiments of the present disclosure may be a volatile memory or a nonvolatile memory, or may include both a volatile memory and a nonvolatile memory. The nonvolatile memory may be a read-only memory (ROM), a programmable ROM (PROM), an erasable programmable PROM (EPROM), an electrically EPROM (EEPROM) or a flash memory. The volatile storage may be a random access memory (RAM), which is used as an external cache. By way of example rather than limitation, many forms of RAMs such as a static RAM (SRAM), a dynamic RAM (DRAM), a synchronous DRAM (SDRAM), a double-data-rate (DDR) SDRAM, an enhanced SDRAM (ESDRAM), a synch link DRAM (SLDRAM), and a direct Rambus RAM (DRRAM) may be used. The memory 702 in the system and method described in some embodiments of the present disclosure is intended to include, but is not limited to, these and any other appropriate types of memories.

In some implementations, the memory 702 stores executable modules or data structures, or a subset thereof, or an extended set thereof, for example, an operating system (OS) 7021 and an application 7022.

The operating system 7021 includes various system programs, such as a framework layer program, a core library layer program, and a driver layer program, to implement various basic services and process a hardware-based task. The application 7022 includes various applications such as a media player or a browser, to implement various application services. A program for implementing the method provided in some embodiments of the present disclosure may be included in the application 7022.

In some embodiments of the present disclosure, the UE further includes a computer program stored in the memory and configured to be executed by the processor. The processor is configured to execute the computer program to implement the following steps: receiving a first indication on a second downlink (DL) frequency domain transmission resource, wherein the first indication is used to activate a first DL frequency domain transmission resource; receiving a channel state information reference signal (CSI-RS) on the first DL frequency domain transmission resource according to a first CSI resource configuration corresponding to the first DL frequency domain transmission resource when it is determined that there is the first CSI resource configuration, wherein the first CSI resource configuration includes a periodicity characteristic of the CSI-RS.

The foregoing method disclosed in some embodiments of the present disclosure may be applied to the processor 701 or implemented by the processor 701. The processor 701 may be an integrated circuit chip having a signal processing capability. During implementation, the steps in the foregoing method may be accomplished by hardware integrated logic circuits or instructions in a software form in the processor 701. The processor 701 may be a general-purpose processor, a digital signal processor (DSP), an application-specific integrated circuit (ASIC), a field-programmable gate array (FPGA) or other programmable logic device, discrete gate or transistor logic device, a discrete hardware component, that can implement or execute the methods, steps, and logic block diagrams disclosed in some embodiments of the present disclosure. The general-purpose processor may be a microprocessor or the processor may be any conventional processor or the like. The steps in the method disclosed with reference to some embodiments of the present disclosure may be directly performed and accomplished by a hardware decoding processor, or performed and accomplished by a combination of hardware and software modules in a decoding processor. The software modules may be located in a computer-readable storage medium well-established in the art, such as a RAM, a flash memory, a ROM, a PROM or an electrically erasable programmable memory or a register. A computer-readable storage medium is located in the storage. The processor reads information from the storage and accomplishes the steps in the foregoing method using hardware of the processor. Specifically, a computer program is stored in the computer-readable storage medium. The computer program is configured to be executed by the processor to implement the steps in the foregoing embodiments of the method for transmitting a reference signal.

It may be understood that these embodiments described in this disclosure may be implemented by hardware, software, firmware, middleware, microcode or a combination thereof. For hardware implementation, a processing unit may be implemented in one or more ASICs, a DSP, a DSP device (DSPD), a programmable logic device (PLD), a field-programmable gate array (FPGA), a general-purpose processor, a controller, a microcontroller, a microprocessor, other electronic unit configured to perform the functions in the present disclosure or a combination thereof.

For a software implementation, the techniques in some embodiments of the present disclosure may be implemented by modules (for example, processes or functions) performing the functions described in some embodiments of the present disclosure. Software codes may be stored in a storage and executed by a processor. The storage may be implemented internal or external to a processor.

Optionally, the processor is configured to execute the computer program to further implement the following steps: receiving a first indication on a second DL frequency domain transmission resource, wherein the first indication is used to activate a first DL frequency domain transmission resource; receiving a channel state information reference signal (CSI-RS) on the first DL frequency domain transmission resource according to a first CSI resource configuration corresponding to the first DL frequency domain transmission resource when it is determined that there is the first CSI resource configuration, wherein the first CSI resource configuration includes a periodicity characteristic of the CSI-RS.

The UE 700 can implement the processes implemented by the UE in the foregoing embodiments. To avoid repetition, details are not described herein again.

In the embodiment of the present disclosure, when a new frequency domain transmission resource is activated, the signal transmission and reception may be performed according to configuration information corresponding to the new frequency domain transmission resource, thereby enabling uninterrupted wireless communication. When a network device is transmitting a CSI-RS, if a new UL and/or DL frequency domain transmission resource is activated, such as the BWP is switched to a new BWP or a new secondary cell is enabled, the transmission of CSI-RS may be performed in an uninterrupted manner by using the method for transmitting a reference signal according to some embodiments of the present disclosure, thereby meeting communication requirements of the wireless communication system.

Embodiment 6

Figure 9:
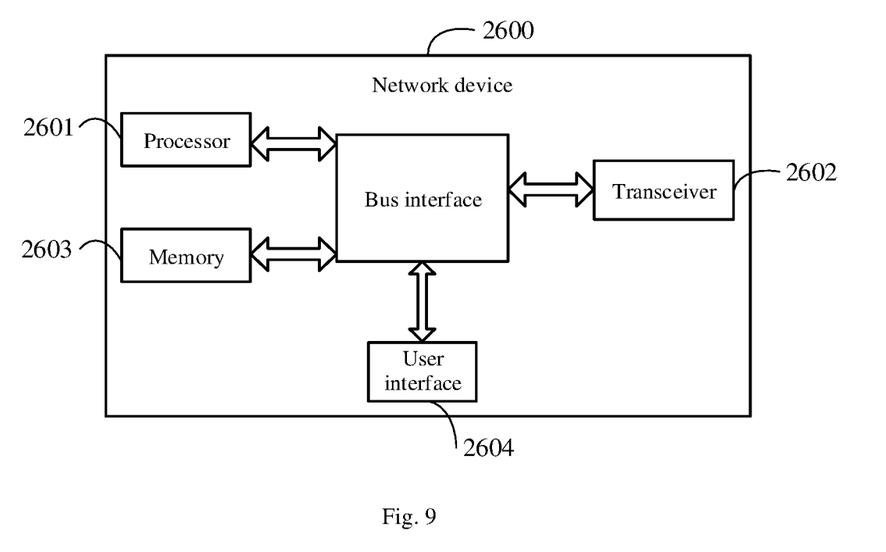
FIG. 9 is another schematic structural diagram of a network device according to some embodiments of the present disclosure.

Referring to FIG. 9, FIG. 9 is a structural diagram of a network device to which some embodiments of the present disclosure are applied. The network device can implement the details of the method for transmitting a reference signal in the foregoing embodiments and achieve the same effects. As shown in FIG. 9, the network device 2600 includes a processor 2601, a transceiver 2602, a memory 2603, a user interface 2604, and a bus interface.

In some embodiments of the present disclosure, the network device 2600 further includes a computer program stored in the memory 2603 and configured to be executed by the processor 2601. The processor 2601 is configured to execute the computer program to implement the following steps: transmitting a first indication on a second DL frequency domain transmission resource, wherein the first indication is used to activate a first DL frequency domain transmission resource; transmitting a CSI-RS on the first DL frequency domain transmission resource according to a first CSI resource configuration corresponding to the first DL frequency domain transmission resource when it is determined that there is the first CSI resource configuration, wherein the first CSI resource configuration includes a periodicity characteristic of the CSI-RS.

In FIG. 9, a bus architecture may include any quantity of interconnected buses and bridges. Various circuits such as one or more processors represented specifically by the processor 2601 and a memory represented by the memory 2603 are linked together. The bus architecture may also link various other circuits such as peripherals, voltage regulators, and power management circuits, which are well known in the art, and therefore are not further described herein. The bus interface provides an interface. The transceiver 2602 may include a plurality of elements, that is, a transmitter and a receiver, to provide units for communicating with various other apparatuses over a transmission medium. For different user equipment, the user interface 2604 may be an interface capable of externally/internally connecting desired devices, including, but not limited to, a keypad, a display, a speaker, a microphone, and a joystick.

The processor 2601 is responsible for managing the bus architecture and general processing. The memory 2603 can store data used by the processor 2601 while performing operations.

In the embodiment of the present disclosure, when a new frequency domain transmission resource is activated, the signal transmission and reception may be performed according to configuration information corresponding to the new frequency domain transmission resource, thereby enabling uninterrupted wireless communication. When a network device is transmitting a CSI-RS, if a new UL and/or DL frequency domain transmission resource is activated, such as the BWP is switched to a new BWP or a new secondary cell is enabled, the transmission of CSI-RS may be performed in an uninterrupted manner by using the method of transmitting a reference signal according to some embodiments of the present disclosure, thereby meeting communication requirements of the wireless communication system.

It should be noted that the terms "include", "have", or any variation thereof used herein are intended to cover a non-exclusive inclusion, such that a process, a method, an article, or a device that includes a list of elements not only includes the list of elements, but also may include other elements not expressly listed or include elements inherent to the process, the method, the article, or the device. In case that there is no further limitation, an element preceded by "includes or including" does not preclude existence of additional identical elements in the process, the method, the article, or the device including the element.

From the foregoing description of the embodiments, a person skilled in the art will clearly appreciate that the method according to the embodiments may be implemented not only by software in conjunction with necessary generic hardware platform, but also by hardware, although the former will be preferred in most cases. Based on such an understanding, essential parts, or parts contributing to the related art, of the technical solution of the present disclosure may be implemented in form of a software product. The software product is stored in a storage medium (e.g., an ROM/RAM, a magnetic disk and an optical disc) and includes several instructions configured to be executed by a terminal (such as a handset, a computer, a server, an air conditioner or a network device) to perform the method according to the embodiments of the present disclosure.

The embodiments of the present disclosure are described above with reference to the accompanying drawings. However, the present disclosure is not limited to the foregoing specific implementations. The foregoing specific implementations are merely illustrative rather than limitative. In light of the teachings of the present disclosure, a person of ordinary skill in the art may further make various forms without departing from the spirit of the present disclosure and the scope of the claims, and these forms all fall within the scope of the present disclosure.

What is claimed is:

1. A method of transmitting a reference signal, performed by a network device, comprising:
   transmitting a first indication on a second downlink (DL) frequency domain transmission resource, wherein the first indication is used to activate a first DL frequency domain transmission resource;
   transmitting a channel state information reference signal (CSI-RS) on the first DL frequency domain transmission resource according to a first CSI resource configuration when it is determined that there is the first CSI resource configuration, and that the first DL frequency domain transmission resource is in an active state and a first activation indication is transmitted to UE, wherein the first CSI resource configuration comprises a periodicity characteristic of the CSI-RS, the periodicity characteristic of the CSI-RS is semi-persistent;
   wherein the first activation indication is used to activate transmission of the semi-persistent CSI-RS on the first DL frequency domain transmission resource, or is used to activate transmission of the semi-persistent CSI-RS on at least one DL frequency domain transmission resource.

2. The method according to claim 1, further comprising:
   transmitting first configuration information, wherein the first configuration information comprises a CSI resource configuration corresponding to at least one DL frequency domain transmission resource, the at least one DL frequency domain transmission resource comprises the first DL frequency domain transmission resource; or
   transmitting second configuration information, wherein the second configuration information comprises a CSI resource configuration corresponding to all DL frequency domain transmission resources, the all DL frequency domain transmission resources comprise the first DL frequency domain transmission resource.

3. The method according to claim 1, further comprising: determining a latest CSI resource configuration as the first CSI resource configuration when it is determined that there are a plurality of CSI resource configurations corresponding to the first DL frequency domain transmission resource.

4. The method according to claim 1, further comprising any one of:
transmitting the first activation indication on the second DL frequency domain transmission resource before transmission of the first indication;
transmitting the first activation indication on the first DL frequency domain transmission resource after transmission of the first indication.

5. The method according to claim 1, wherein the first indication carries the first activation indication.

6. The method according to claim 1, wherein the method further comprises:
stopping transmitting the CSI-RS on the at least one DL frequency domain transmission resource when transmitting a deactivation indication, wherein the at least one DL frequency domain transmission resource comprises the first DL frequency domain transmission resource.

7. The method according to claim 1, wherein the DL frequency domain transmission resources comprise at least one of DL bandwidth part (BWP) and DL secondary cell.

8. A method of receiving a reference signal, performed by a user equipment (UE), comprising:
receiving a first indication on a second downlink (DL) frequency domain transmission resource, wherein the first indication is used to activate a first DL frequency domain transmission resource;
receiving a channel state information reference signal (CSI-RS) on the first DL frequency domain transmission resource according to a first CSI resource configuration when it is determined that there is the first CSI resource configuration, and that the first DL frequency domain transmission resource is in an active state and a first activation indication is received from a network device, wherein the first CSI resource configuration comprises a periodicity characteristic of the CSI-RS, the periodicity characteristic of the CSI-RS is semi-persistent;
wherein the first activation indication is used to activate reception of the semi-persistent CSI-RS on the first DL frequency domain transmission resource, or is used to activate reception of the semi-persistent CSI-RS on at least one DL frequency domain transmission resource.

9. The method according to claim 8, further comprising:
receiving first configuration information, wherein the first configuration information comprises a CSI resource configuration corresponding to at least one DL frequency domain transmission resource, the at least one DL frequency domain transmission resource comprises the first DL frequency domain transmission resource; or
receiving second configuration information, wherein the second configuration information comprises a CSI resource configuration corresponding to all DL frequency domain transmission resources, wherein the all DL frequency domain transmission resources comprise the first DL frequency domain transmission resource.

10. The method according to claim 8, further comprising:
determining a latest CSI resource configuration as the first CSI resource configuration when it is determined that there are a plurality of CSI resource configurations corresponding to the first DL frequency domain transmission resource.

11. The method according to claim 8, further comprising any one of:
receiving the first activation indication on the second DL frequency domain transmission resource before reception of the first indication;
receiving the first activation indication on the first DL frequency domain transmission resource after reception of the first indication.

12. The method according to claim 8, wherein the first indication carries the first activation indication.

13. The method according to claim 8, wherein the method further comprises:
stopping receiving the CSI-RS on the at least one DL frequency domain transmission resource when receiving a deactivation indication, wherein the at least one DL frequency domain transmission resource comprises the first DL frequency domain transmission resource.

14. The method according to claim 8, wherein the DL frequency domain transmission resources comprise at least one of DL bandwidth part (BWP) and DL secondary cell.

15. A network device, comprising: a memory, a processor and a computer program stored in the memory and configured to be executed by the processor, wherein the processor is configured to execute the computer program, to implement steps of the method according to claim 1.

16. A user equipment (UE), comprising: a memory, a processor and a computer program stored in the memory and configured to be executed by the processor, wherein the processor is configured to execute the computer program, to implement steps comprising:
receiving a first indication on a second downlink (DL) frequency domain transmission resource, wherein the first indication is used to activate a first DL frequency domain transmission resource;
receiving a channel state information reference signal (CSI-RS) on the first DL frequency domain transmission resource according to a first CSI resource configuration when it is determined that there is the first CSI resource configuration, and that the first DL frequency domain transmission resource is in an active state and a first activation indication is received from a network device, wherein the first CSI resource configuration comprises a periodicity characteristic of the CSI-RS, the periodicity characteristic of the CSI-RS is semi-persistent;
wherein the first activation indication is used to activate reception of the semi-persistent CSI-RS on the first DL frequency domain transmission resource, or is used to activate reception of the semi-persistent CSI-RS on at least one DL frequency domain transmission resource.

17. The UE according to claim 16, wherein the processor is configured to execute the computer program, to further implement a step of:
stopping receiving the CSI-RS on the at least one DL frequency domain transmission resource when receiving a deactivation indication, wherein the at least one DL frequency domain transmission resource comprises the first DL frequency domain transmission resource.

18. The UE according to claim 16, wherein the processor is configured to execute the computer program, to further implement steps of:

receiving first configuration information, wherein the first configuration information comprises a CSI resource configuration corresponding to at least one DL frequency domain transmission resource, the at least one DL frequency domain transmission resource comprises the first DL frequency domain transmission resource; or receiving second configuration information, wherein the second configuration information comprises a CSI resource configuration corresponding to all DL frequency domain transmission resources, wherein the all DL frequency domain transmission resources comprise the first DL frequency domain transmission resource.

19. The UE according to claim 16, wherein the processor is configured to execute the computer program, to further implement any one step of:

receiving the first activation indication on the second DL frequency domain transmission resource before reception of the first indication;

receiving the first activation indication on the first DL frequency domain transmission resource after reception of the first indication.

20. The UE according to claim 16, wherein the first indication carries the first activation indication.

* * * * *